March 11, 1969  A. MARZOCCHI ET AL  3,432,332
METHOD FOR THE IMPREGNATION OF FIBROUS GLASS
Filed Jan. 21, 1965  Sheet 1 of 2
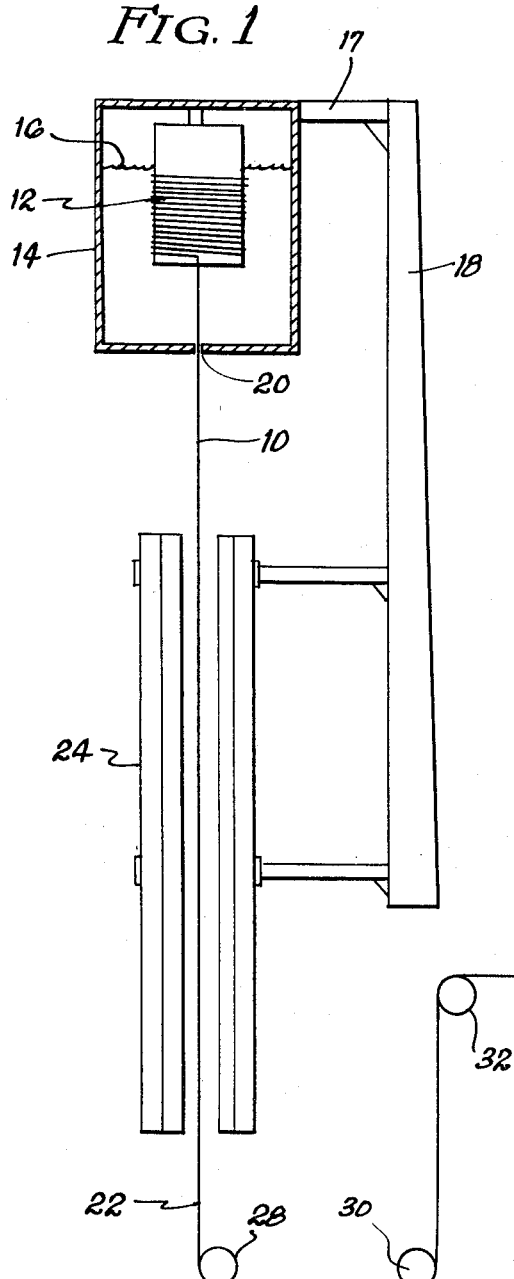
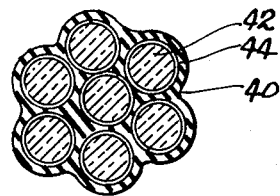
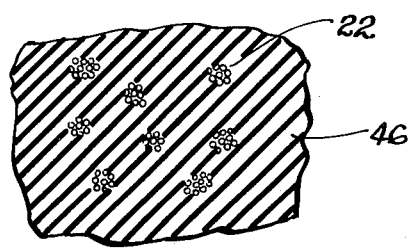
INVENTORS
Alfred Marzocchi
John A. Waugh
by Staelin and Overman
Attys

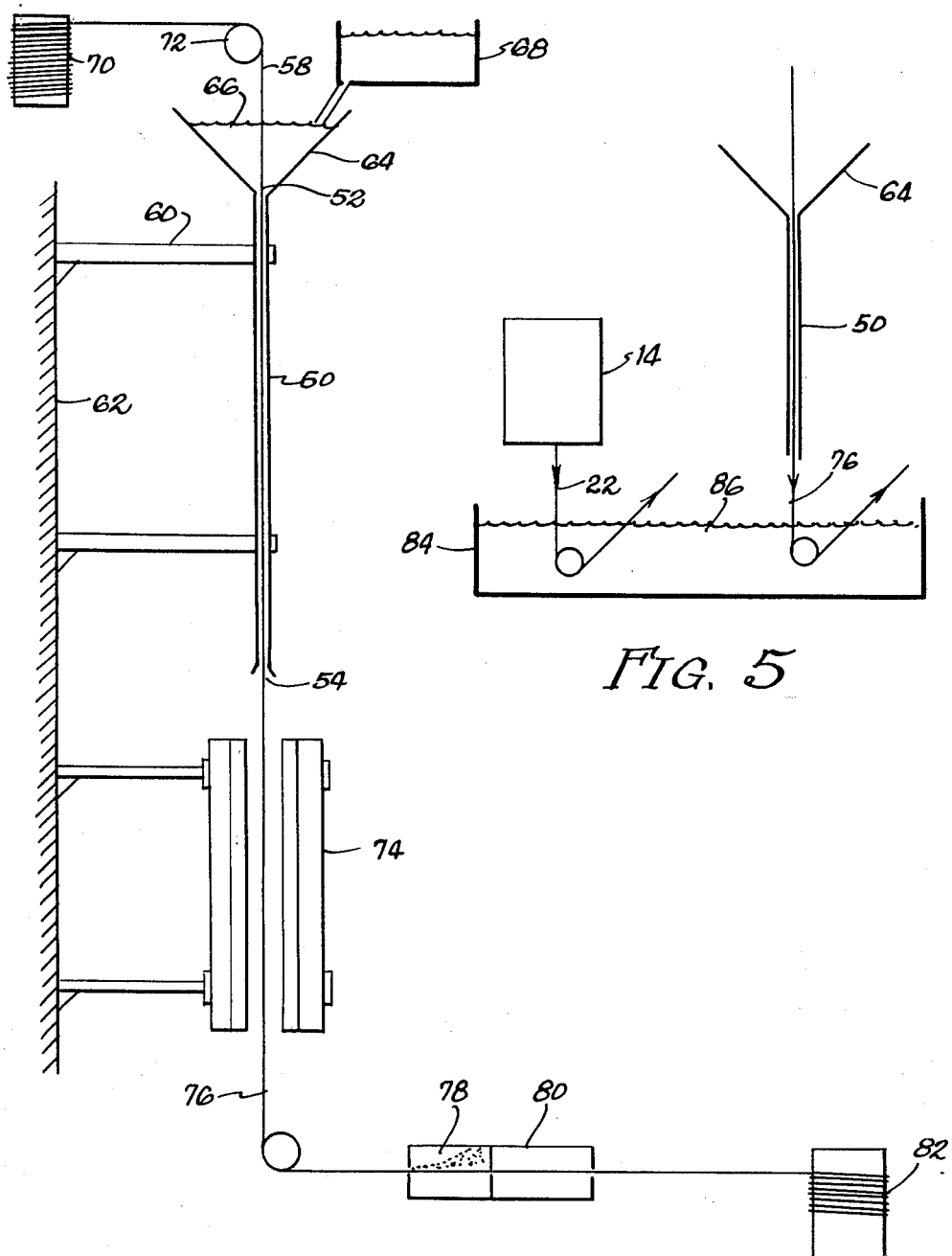

3,432,332
METHOD FOR THE IMPREGNATION OF FIBROUS GLASS

Alfred Marzocchi, Cumberland, R.I., and John A. Waugh, Huntingdon, Pa., assignors to Owen-Corning Fiberglas Corporation, a corporation of Delaware
Filed Jan. 21, 1965, Ser. No. 427,050
U.S. Cl. 117—62            10 Claims
Int. Cl. B44d 1/44; B05c 3/12

ABSTRACT OF THE DISCLOSURE

The invention is addressed to concepts for the rapid and continuous impregnation of endless bundles of glass fibers with a liquid impregnating composition. In one concept, the endless bundle of glass fibers is housed within a pressure vessel having an outlet orifice and which contains the liquid impregnating composition under pressure in a manner to cover the orifice whereby the glass fiber bundle is forced under pressure from the pressure vessel through the orifice in a manner which forcibly pushes the bundle through the orifice so that it becomes substantially completely impregnated with the liquid composition as it is displaced through the orifice. In the other concept, use is made of capillary action to force the impregnating composition into the innermost regions of the glass fiber bundle by pulling the bundle of glass fibers through a capillary tube with the fibers wet with the liquid impregnating composition wherein capillary action is generated to supply the tremendous forces for wetting out the interior of the glass fiber bundle.

---

This invention relates to the treatment of glass fibers for use of the glass fibers in combinations with elastomeric materials in the manufacture of glass fiber-elastomeric products and it relates more particularly to the treatment of such glass fibers while in the form of endless bundles, such as strands, yarns or cords of glass fibers.

Because of the perfectly smooth surfaces of glass fibers and because of their nonporosity, it is difficult to secure a strong and permanent physical attachment between the glass fiber surfaces and elastomeric materials with which the glass fibers are combined in the manufacture of glass fiber reinforced elastomeric products. Because of the highly hydrophilic characteristics that predominate on the perfectly smooth glass fiber surfaces, it is equally difficult to establish a strong and permanent bonded relationship between the hydrophobic elastomeric materials and the hydrophilic glass fiber surfaces and any bonding relationship that is established is quickly lost by the moisture film which forms to separate the glass fiber surfaces from the elastomeric materials in the presence of moisture or high humidity.

In the absence of a strong and permanently bonded relationship between the glass fiber surfaces and the elastomeric material, full utilization cannot be made of the high strength and other desirable properties intended to be derived from the use of glass fibers.

Considerable research and development efforts have been extended in the search to alleviate this problem and considerable improvements have already been achieved by special treatments applied to the glass fiber surfaces to render the surfaces more receptive to elastomeric materials.

In the copending application Ser. No. 750,253, filed on July 22, 1958, now abandoned, description is made of the treatment of glass fibers with an anchoring agent in the form of an amino silane, such as gamma-aminopropyltriethoxysilane, to render the glass fiber surfaces more receptive to elastomeric materials. It is believed that the silicon or silicon oxide linkages of the silane or its polymerization products (polysiloxanes) become attached or oriented to the silicon oxide groups present in the glass fibers while the organic amino group of the organo silicon compound receives the elastomeric materials or enters into the cure or vulcanization thereof strongly to bond the elastomeric material to the glass fiber surfaces.

In the copending application Ser. No. 406,501, filed Oct. 26, 1964, now Patent No. 3,391,052, and entitled "Glass Fibers Treated for Combination with Elastomeric Materials and Method," and in the copending applications Ser. No. 397,956, Ser. No. 398,305 and now abandoned Ser. No. 400,517, filed Sept. 21, 1964, Sept. 22, 1964 and Sept. 30, 1964, respectively, description is made of the process of treating the sized glass fibers after being formed into strands, yarns or bundles to impregnate the bundle of glass fibers with an elastomeric composition which operates to cushion the fibers and to protect the fibers against destruction by mutual abrasion. The elastomer-containing impregnating composition also introduces elastomeric materials into the inner regions of the glass fiber bundle which, during cure or vulcanization of the elastomeric material forming the continuous phase of the glass fiber product, can become blended with the continuous phase of elastomeric material with which the bundle of glass fibers are combined in the manufacture of the glass fiber-elastomeric products thereby more fully and intimately to integrate the glass fiber system into the elastomeric materials of the continuous phase.

It is desirable to achieve as complete impregnation as possible of the glass fiber bundle in order individually to coat each of the filaments of the glass fibers making up the bundle. This has been difficult to achieve for a number of reasons. In the first place, the glass fibers or filaments are of extremely small dimension in the order of ten-thousandths of an inch in diameter, such that the bundle is usually formed of hundreds of such fine filaments brought together during the forming operation to form the single strand. Thus it becomes difficult to achieve full and complete penetration of the packed fiber bundle of sized glass fibers. In the second place, it has been found that when the formed endless bundles of glass fibers are drawn through a bath of the elastomeric impregnating composition, the tension under which the glass fiber bundle is placed operates to draw the fibers together into a more compact bundle with the result that effective barriers are formed against penetration of the elastomeric impregnating composition with the result that the composition is incapable of reaching into the innermost regions of the glass fiber bundle. Thirdly, the impregnating composition which is based upon the presence of an elastomeric material is usually of fairly high viscosity and therefore incapable of free flow as a fluid into the innermost regions of the packed bundle of glass fibers.

Thus it is an object of this invention to provide a method and means for the impregnation of endless bundles of glass fibers to achieve a higher degree of penetration into the bundle of glass fibers and more effectively to coat the individual fibers with the impregnating composition and it is a related object to provide a method and means of the type described which is simple and efficient in operation; which provides for fuller penetration into the bundle of glass fibers; which enables impregnation of the fiber bundles with an elastomeric impregnating composition for cushioning the fibers in the bundle and to provide a receptive integrating base for combination with elastomeric materials forming the continuous phase of the glass fiber-elastomeric product.

It has been found further that the strength characteristics capable of being contributed by the glass fibers to the elastomeric material are greatly benefitted by increased loading or the amount of elastomeric impregnant retained in the glass fiber bundle, strand, yarn, cord or fabric, hereafter collectively referred to as glass fiber bundle. With increased loading of the glass fiber bundle, more cushioning and more protection is achieved and fuller integration for fuller utilization of the strength properties of the glass fibers is achieved.

Thus it is another object of this invention to provide a method and means for increasing the amount of elastomeric impregnant which can be loaded into the glass fiber bundle and which can be retained in the glass fiber bundle for subsequent combinations with the elastomeric material of the continuous phase.

These and other objects and advantages of this invention will hereinafter appear and for purposes of illustration, but not of limitation, an embodiment of the invention is shown in the accompanying drawings in which:

FIG. 1 is a schematic elevational view of an arrangement of elements which may be employed in the practice of this invention;

FIG. 2 is a schematic cross sectional view of the glass fiber bundle produced by the equipment illustrated in FIG. 1;

FIG. 3 is a schematic sectional view of the glass fiber-elastomeric product produced in accordance with the practice of this invention;

FIG. 4 is a schematic elevational view of a modification in the system which may be employed in the practice of this invention; and FIG. 5 is a schematic elevational view showing a further concept of this invention.

Since the invention is not addressed to the impregnating compositions per se but only to the method and means for achieving fuller impregnation of the glass fiber bundle, detailed description need not be given of the formulations for the impregnating compositions which may be employed in the practice of this invention. For detailed descriptions thereof, reference may be made to the aforementioned copending applications and to the following formulations which are representative of impregnating compositions which may be employed in the practice of this invention.

Example 1

| | Parts by wt. |
|---|---|
| Neoprene rubber | 100 |
| Powdered magnesium oxide | 4 |
| Powdered zinc oxide | 5 |
| Channel black | 15 |
| Trialkyl thiourea accelerator for the neoprene rubber (thiate B) | 1 |

Example 2

| | |
|---|---|
| Paracril C elastomer | 100 |
| SRF carbon black | 25 |
| Powdered zinc oxide | 5 |
| Aminox (reaction product of diphenyl amine acetone) | 0.5 |
| Stearic acid | 1 |
| Dicumyl peroxide | 40 |

Example 3

| | |
|---|---|
| Natural rubber latex-resorcinol-formaldehyde resin dispersed in aqueous medium to a solids content of 38% (Lotol 5440, U.S. Rubber Co., Naugatuck Chemical Division) | 40–80 |
| Water | 60–20 |

Example 4

| | Parts by wt. |
|---|---|
| Resorcinol-formaldehyde resin | 2.0 |
| Formaldehyde (37% solution) | 1 |
| Concentrated ammonium hydroxide | 2.7 |
| Vinyl pyridine terpolymer (latex 42%) | 25.0 |
| Neoprene rubber latex (50% solids) | 41.0 |
| Butadiene latex (60% solids) | 5.0 |
| Sodium hydroxide | 0.05 |
| Gamma-aminopropyltriethoxy silane | 1 |
| Rubber accelerator | 1 |
| Water | 1100 |

As used herein, the term "glass fiber bundles" is meant to include endless strands of glass fibers which are formed of hundreds of fine glass fiber filaments gathered together as the glass fiber filaments are drawn from the molten streams of glass issuing from the bottom side of a glass melting furnace and which are sized with a glass fiber size preferably containing an anchoring agent applied as the glass fiber filaments are drawn and gathered together in strand formation. Included also are the cords, yarns and threads formed of the strands of glass fibers by winding, twisting and plying a plurality of such glass fiber strands together and included also are strands, yarns and cords which are formed of discontinuous fibers which are gathered together and drafted in yarn formation after a size has been applied.

In accordance with the practice of this invention, fuller impregnation of the glass fiber bundle can be achieved by the system illustrated in FIG. 1 of the drawings in which a glass fiber bundle in the form of an endless strand 10 is supplied from a spool 12 mounted within a pressure vessel 14 containing a supply of liquid impregnating composition 16. The pressure vessel is mounted by a bracket 17 onto a stand 18 which supports the vessel with its orifice 20 facing in the downwardly direction.

The positive pressure prevailing within the vessel or the differential pressure between the interior of the vessel and the outside serves to displace the strand 10 to the orifice 20 and by reason of the pressure differential between the interior and the exterior of the vessel, the strand and impregnant is forced through the orifice 20 by a process similar to that of extrusion. Thus, in effect, the strand is pushed or stuffed through the orifice. This operates effectively to open the strand immediately in advance of the orifice thereby to expose the innermost regions of the glass fiber bundle to the liquid impregnating composition substantially completely to impregnate the glass fiber bundle immediately in advance of its being pushed or extruded from the vessel. The pushing action, which places the glass fiber bundle under compression, operates also to spread the fibers in the bundle for maximum separation whereby more of the impregnating composition can be loaded into the glass fiber system during extrusion from the vessel. This is to be distinguished from the exact opposite results which are secured by normal impregnation wherein the glass fiber bundle is drawn through a bath or die such that the glass fibers are placed under tension which operates to draw the fibers more tightly together into the bundle to minimize the penetration and the amount of impregnation.

From the extrusion vessel 14, the impregnated bundle 22 of glass fibers can be advanced directly between a vertically disposed bank of heaters 24 to volatilize off diluent and/or to set the elastomer. From the bank of heaters 24, the impregnated strand 22 can be advanced directly for rewinding onto the spool 26. In the preferred practice of this invention it is desirable to coat the impregnated bundle of glass fibers with a lubricating material such as powdered silica dust, carbon black, zinc stearate, glass powder and the like, as described in the aforementioned copending application Ser. No. 406,501, now Patent No. 3,391,052, to facilitate further processing of the impregnated bundle of glass fibers in the subsequent winding, plying, twisting or weaving operations. For this purpose, the impregnated bundle 22 of glass fibers is trained over rollers 28, 30 and 32 for passage through a duster 34 followed by a wiper 36 by which the powder is applied to the surface and rubbed onto the surface and excess removed before the bundle is rewound by the winder 38 onto the spool 26.

Whereas before it was difficult to load the glass fiber bundle with more than 5–10 percent by weight of elastomeric impregnant, loading in amounts up to 40 percent by weight can be achieved by the practice of this invention. As illustrated schematically in FIG. 2, the elastomeric impregnating composition 40 is capable of substantially complete penetration into the innermost regions of the glass fiber bundle substantially completely to coat the individual filaments 42 of glass fibers having a size coating 44 thereon substantially completely to fill the interstices in between the fibers and to cushion the fibers one from the other in a manner to enable orientation of the fibers under stress so that the plurality of fibers will come into play under tension for cumulative contribution of their strength characteristics in reinforcement. When the elastomeric material of the continuous phase 46 is cured or vulcanized with the bundles 22 of impregnated fibers distributed in the desired arrangement therein, the glass fibers, through the elastomeric impregnant, become completely integrated into the glass fiber-elastomeric system.

In another system which is somewhat unrelated to the process previously described, it has also been found that fuller impregnation of elastomeric composition of the type described into the glass fiber bundles can be achieved by utilization of forces of capillary action to draw impregnating composition into the innermost interstices of the glass fiber bundle.

As illustrated in FIG. 4, the system includes an elongate capillary tube 50 open at its opposite ends 52 and 54 with the bore 56 extending therethrough being dimensioned to be only slightly larger in diameter than the cross-sectional dimension of the fiber bundle 58. The capillary tube is vertically supported by a bracket 60 on a stand 62 and the upper inlet end is provided with a feed chute 64 of conical section into which liquid impregnating composition 66 is fed from a reservoir 68 to maintain the liquid composition at a desired level. The endless length of the glass fiber bundle is supplied from a spindle 70 and is trained over roller 72 for passage downwardly into the feed chute and through the capillary tube whereby liquid impregnating composition is drawn with the bundle into the capillary tube and is caused to flow by capillary action as well as by positive pressure into the innermost regions of the glass fiber bundle.

The glass fiber bundle, impregnated with the liquid elastomeric composition, is advanced from the outlet 54 of the capillary tube to between a bank of heaters 74 for elimination of diluent and then, if desired, the impregnated bundle 76 is sprinkled or dusted with a lubricating powder in the duster 78 followed by the wiper 80 before it is wound upon the spindle 82.

As previously pointed out, dusting or coating with silica, graphite, glass powder, starch, zinc acetate and the like lubricating material is not essential but is preferably employed where the impregnated glass fiber bundle is to be further processed by winding, twisting, plying or weaving, otherwise the presence of the elastomeric material on the surfaces of the glass fiber bundle leads to seizures or other difficulties during the processing steps. When the fiber bundle is to be used directly in the elastomeric system or where the further processing does not embody such winding, twisting, plying or weaving operations, the additional protective or lubricating coating can be eliminated.

Even though the glass fiber bundle is placed under tension during the passage through the capillary tube 50 with the liquid impregnating composition 66, the force generated by the drag of liquid impregnating composition with the fiber bundle into the confining regions of the capillary tube is effective to supply positive pressure which forces liquid composition into the bundle of glass fibers during passage through the tube. Such positive force operates in addition to the capillary forces which are set up by the presence of the liquid composition in intimate contact with the tightly packed bundle of fine glass filaments to draw the liquid into the interstices between the fibers thereby substantially to fill the interstices with the liquid impregnating composition and thereby also increase loading of the glass fiber bundle.

A novel concept which may be adapted to either process for fuller impregnation or to other systems for impregnation of bundles of glass fibers with elastomeric material, can follow the step of impregnation substantially immediately with treatment for coagulation of the elastomeric material to set the elastomer in the impregnated bundle of glass fibers thereby to minimize the possibilities of flow from the glass fiber bundle during the subsequent steps of drainage or squeezing out of impregnating composition during winding of the impregnated glass fiber bundle or loss of impregnating composition during heating to eliminate diluent or cure of the elastomeric impregnating composition.

Coagulation can be achieved by contacting the impregnated glass fiber bundle with a coagulant for the elastomer such as by running the bundle 22 of impregnated glass fibers directly from the pressure vessel 14 or from the capillary tube 50 into an acid bath 84 containing an acid coagulant 86 which operates to throw the elastomer onto the cured side or to coagulate the elastomer sufficiently to minimize subsequent flow under heat and/or pressure.

Instead of making use of a bath of acidic coagulant, use can be made of other liquid or solid substances generally employed for coagulation of the particular elastomeric material. Similarly, instead of running the impregnated glass fiber bundle through a liquid bath of the coagulant, the coagulant can be otherwise applied as by spraying or wiping onto the bundle, if it is a liquid, or by dusting, sprinkling or wiping onto the surface, if it is a powder.

Thereafter, the bundle with the impregnant coagulated can be processed, as previously described, through the bank of heaters to eliminate diluent. However, the heating step can be avoided if the coagulant does not need heat for cure or if the diluent can otherwise be eliminated simply, by slow evaporation in air.

As used herein, the term "elastomeric material" is meant to include natural rubber or synthetic rubber, such as chloroprene, isoprene, neoprene, butylene rubber, chlorinated rubber, butadiene-styrene copolymer, butadiene-acrylate copolymers, butadiene-acrylonitrile copolymers, and the like.

It will be apparent from the foregoing that there is provided a new and improved concept for achieving fuller impregnation of tightly packed bundles of glass fibers and whereby fuller impregnation can be achieved with such viscous systems as contain elastomeric materials to accomplish the desired objectives of fuller impregnation and greater loading of glass fiber bundles to enhance their functionality in the combinations made with elastomeric materials in the manufacture of glass fiber-elastomeric products such as glass fiber reinforced tires, belting, and the like.

In the claims:

1. In the method for impregnation of glass fibers in the form of endless bundles comprising the steps of extruding the endless bundles of glass fibers through an orifice of a pressure vessel containing the impregnating material in liquid form covering said orifice whereby the bundles of glass fibers are placed under compression to push the bundle through the orifice to enable substantially complete impregnation with the liquid impregnant as the glass fiber bundle is ejected through said orifice from said pressure vessel.

2. The method for impregnation as claimed in claim 1 which includes the additional step of heating the extruded bundle of glass fibers for elimination of diluent.

3. The method for impregnation as claimed in claim 1 which includes the step of heating the extruded bundle to at least partially set the impregnating material.

4. In the method of impregnating glass fibers in the form of endless bundles with a liquid composition containing a curable elastomeric material comprising housing the impregnating composition within a pressure vessel, extruding the endless bundles of glass fibers from the vessel through an orifice while in combination with the impregnating composition which covers the orifice whereby the endless bundles of glass fibers are subjected to compressive forces which operate to push the fiber bundle through the orifice to enable substantially complete impregnation with the elastomeric composition as the glass fiber bundle is ejected through said orifice from said pressure vessel.

5. The method as claimed in claim 4 which includes the step of advancing the extruded bundle of glass fibers through an elevated temperature zone to drive off diluent from the impregnating material.

6. The method as claimed in claim 4 which includes the step of advancing the extruded bundle of glass fibers through an elevated temperature zone to advance the elastomeric material towards a cured stage.

7. The method as claimed in claim 4 which includes the steps of eliminating diluent from the impregnating material in the glass fiber bundle and coating the impregnated bundle of glass fibers with a lubricating substance to enable subsequent processing in at least one of the steps of winding, twisting, plying and weaving of the glass fiber bundle.

8. The method as claimed in claim 4 which includes the step of exposing the impregnated bundle of glass fibers to a coagulant for the elastomeric material to set the elastomeric material in the glass fiber bundle.

9. In the treatment of glass fibers to render the glass fibers more receptive to elastomeric materials in the manufactuer of glass fiber-elastomeric products in which a plurality of glass fibers are sized in forming and gathered together into an endless glass fiber bundle, the improvement wherein the bundles of glass fibers are impregnated with an elastomeric composition comprising housing a liquid elastomeric impregnating composition in a pressure vessel having an orifice with the liquid composition covering said orifice, extruding the glass fiber bundles from the pressure vessel through the orifice while in combination with the impregnating composition whereby the endless bundles of glass fibers are subjected to compressive forces which operate to push the bundle through the orifice to enable substantially complete impregnation with the elastomeric composition as the bundle of glass fibers is ejected through said orifice from said pressure vessel.

10. The treament of glass fibers as claimed in claim 9 which includes the steps of heating the impregnated bundles of glass fibers to eliminate diluent, coating the impregnated glass fiber bundles with a lubricating composition and then winding the impregnated and coated glass fiber bundles onto a spool.

References Cited

UNITED STATES PATENTS

| 2,456,650 | 12/1948 | Ryan | 117—115 |
| 2,647,296 | 8/1953 | Shive | 117—115 X |
| 2,877,501 | 3/1959 | Bradt | 264—143 |
| 3,081,195 | 3/1963 | Biefeld | 117—126 |

FOREIGN PATENTS 459,410  1/1937  Great Britain.

ALFRED L. LEAVITT, *Primary Examiner.*

C. R. WILSON, *Assistant Examiner.*

U.S. Cl. X.R.

117—115